United States Patent [19]

Inoue

[11] 4,358,379

[45] Nov. 9, 1982

[54] PROCESS FOR REFINING ELECTRIC INSULATING LIQUIDS

[76] Inventor: Noboru Inoue, 6-2-3-1205, Nishinakajima, Yodogawa-ku, Osaka, Japan

[21] Appl. No.: 209,297

[22] Filed: Nov. 21, 1980

[51] Int. Cl.³ .............................................. B01D 15/00
[52] U.S. Cl. .................................... 210/663; 210/679; 210/748
[58] Field of Search ............. 174/14 R; 210/663, 665, 210/679, 681, 683, 685, 688–690, 774, 804, 806, 807, 748, 787, 669

[56] References Cited

U.S. PATENT DOCUMENTS

| 2,653,089 | 9/1953 | Brooke | 210/688 |
| 2,985,706 | 5/1961 | Dobry | 174/14 R |
| 3,161,488 | 12/1964 | Eastwood et al. | 210/689 |
| 3,894,171 | 7/1975 | Kusay | 174/14 R |

*Primary Examiner*—Ivars C. Cintins
*Attorney, Agent, or Firm*—Wenderoth, Lind & Ponack

[57] ABSTRACT

A method of efficiently eliminating impurities, particularly of low molecular weight and low concentration, from electric insulating liquids by means of applying an electric field to the electric insulating liquid to charge the contaminant particles therefrom and then contacting the thus-treated liquid with at least one absorbent to remove the charged contaminant particles from said liquid by means of an absorbent having ion-radicals in its structure, such as zeolite, and then eliminating the rough particles therefrom by means such as a percolator, centrifuge or precipitation tank. In certain cases wherein a large amount of contaminants which interfere with the insulating properties of the electric insulating liquid are present, the electric insulating liquid is first heated and subsequently contacted with an absorbent prior to the step of applying an electric field to preliminarily remove contaminants therefrom.

19 Claims, 3 Drawing Figures

PROCESS FOR REFINING ELECTRIC INSULATING LIQUIDS

BACKGROUND OF THE INVENTION

The present invention relates to a process for efficiently absorbing and eliminating impurities in electric insulating liquids by means of a combination of high electric field action and ion-radical absorbent action. These impurities consist primarily of low molecular weight materials ordinarily present in low concentrations in the electric insulating liquid.

At present, oily liquids, such as vegetable or mineral oils are used as insulating liquids and these materials are relatively pure electric insulating liquids per se. However, the life of such insulating oils depends upon the degree of refinement of the polar compounds or unsaturated compounds which are present in the oils, when a low degree of refining of such oils is carried out. Such polar and/or unsaturated compounds serve to deteriorate the electric insulating capacities of the liquid by, e.g., making them more conductive and thus such polar and unsaturated compounds are undesirable.

In addition to being deteriorated by the undesirable contaminants described above, the conventionally used oily insulating liquids are deteriorated as a result of polymerization caused by the existing oxygen or hydrogen in the liquids or by condensation due to the existence of hydrogen generated from a CORONA discharge when used as an electric insulating liquid. To counteract the above, the insulating oils should be refined as highly as possible before pouring into an electrical device so as to eliminate electrically conductive impurities of low molecular weight at low concentrations as discussed above, which contaminants apparently represent the chief cause of deterioration of these lquids.

DESCRIPTION OF THE PRIOR ART

Up to the present time, the fine particle of contaminants found in insulating liquids, e.g., polar compounds and unsaturated compounds, have been removed by absorption with absorbents such as activated kaolin or activated alumina and the rough particles have been eliminated by such means as a percolator or a centrifugal separation device. In respect to the removal of such fine particles, this has been largely ineffective because the absorbent pore size of the aforementioned absorbents are relatively large in that activated kaolin has a pore size of 80 to 180 Å and the activated alumina has a pore size ranging from 50 to 150. Å. This large pore size causes a loss of the oily liquid itself because the pore size of these materials are such as to absorb substantial quantities of such insulating liquid, while at the same low molecular weight fine particles of contaminants are not sufficiently absorbed by such activated alumina and kaolin materials because such activated absorbent indiscriminately permits the absorption of the oil and low molecular weight materials and do not preferentially absorb the low molecular weight contaminants, which is the very purpose of such absorption procedure. Further, the absorbing powers of these kaolin and alumina materials are such that the capillarity of said materials are not very strong compared with the viscous resistance of the oils and thus the absorbing power is limited and the percentage of low molecular weight contaminants of low concentration absorbed by these conventional materials are extremely low and practically non-existent.

As an example of the absorptive capacity of the kaolin and alumina materials, when the hydrate concentration of insulating oils is 200 ppm, activated kaolin has the capacity to lower the concentration of such contaminants only to 50-60 ppm whereas activated alumina lowers it to about 30 ppm. To lower the hydrate concentration less than this figure, i.e., to 5-10 ppm, it is necessary to use vacuum evaporation together with the absorbing process and a large quantity of absorbent and a long processing time are required.

According to the prior art, there are other methods to refine such electrical insulating oils, there are other methods of refining the insulating oils. One method is to impart a static electrical field to the condensation absorbent mixed with the insulating liquid and another method is to impart a static voltage from an electrode where the porous substances are initially filled in between the electrodes. However, the former method has a disadvantage in that the condensating absorbent immersed in the liquid causes oil deterioration and the latter method has a disadvantage in that leaking electric current increased in the early stage by agglutinating the fine particles to the substance to be filled and it takes time to reproduce the absorbing fine particles, which are rescattered in the liquid by the action of this electric current.

SUMMARY OF THE INVENTION

The present invention relates to a process of absorbing and eliminating impurities from electrical insulating liquids by means of combining high electric field action and ion-radical absorbent action. Such absorbent material is typified by use of an absorbent having an ion-radical, such as zeolite in which the pores of such absorbent are generally smaller than the molecules of the electrical insulating liquid, but at the same time large enough to permit the smaller molecules of the contaminants to be selectively absorbed by such absorbent.

It is thus an object of the present invention to eliminate the contaminants which interfere with the insulating properites of electrical insulating liquids by the use of high electric field action and an ion-radical absorbent material.

It is another object of the present invention to use an ion-radical absorbent material which has pores small enough to prevent the insulating liquid from being absorbed therein, while at the same time preferentially absorbing a low molecular weight, low concentrated impurities and especially electrically conductive impurities which diminish the insulating the properties of the liquid.

It is still another object of the present invention to effectively refine such electrical insulating liquids in a manner far more efficient than achieved by prior art records.

BRIEF DESCRIPTION OF THE DRAWINGS

These and other objects of the invention will become apparent from the following specification, taken together with the accompanying drawings, in which.

DETAILED DESCRIPTION OF THE INVENTION

Figure 1:
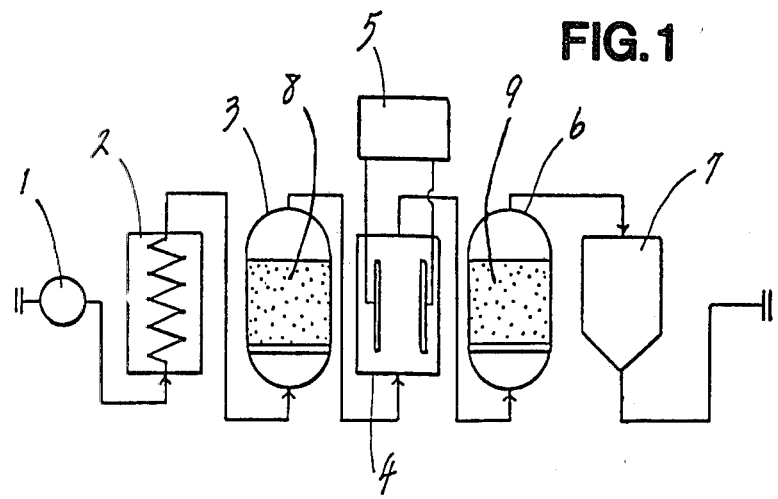
FIG. 1 is a flow sheet showing a first embodiment of the present invention and the apparatus employed.

FIG. 1 represents one embodiment of the present invention. In FIG. 1, 1 is a pump, 2 is a heater, 3 is a front treatment tank, 4 is an ionizer, 5 is its power resource device, 6 is an absorption tank and 7 is a percolator.

According to the method of the present invention, the electric insulating liquid to be treated is continuously sent to the ionizer 4 after passing through the heater 2 and the front treatment tank 3 by operation of the pump 1. The absorbents 8, such as the activated kaolin and the activated alumina, are filled in the said front treatment tank 3 and the insulative effect of the untreated liquid increases by dehydrating and eliminating most of the colored molecules by absorption after contacting the absorbent material 8. Thus, the front treatment tank 3 is a first absorbent treatment designed to increase the effect of ionizing and electrifying the insulating material in the ionizer 4. Thus, other absorbents, such as activated carbon or a zeolite absorbent can be used in the same tank as long as the same results and effect are obtained or indeed mixtures of such absorbents may be used.

The heater 2 is for activating the absorptive capacity of the front treatment tank 3 and the heating temperature is 50°-60° C., when the activated kaolin or the activated alumina is used in the front treatment tank 3. If other absorbents are used, it is desirable to maintain the heating temperature below this range because the liquid is easily deteriorated at temperatures higher than 60° C.

In the ionizer 4, FIG. 1, a high voltage electric field is imparted to the untreated liquid. This high voltage electric field can be replaced by a static electric field, an alternating electric field, a high frequency electric field and combined or superimposed electric fields, etc. The means are not so important as the ultimate objective which is to ionize or charge the impurities so as to be easily removed in a subsequent absorptive step to be subsequently described. By the action of the high voltage electric field, the impurities in the liquid are ionized or charged with electricity and at the same time the fine particles are condensed and tend to adhere to each other in solution, thereby forming somewhat larger or rougher particles.

The ionized and electrified liquid in ionizer 4 of FIG. 1 is sent into the following absorption tank 6. A granule-shaped or splinter-shaped absorbent 9 having ion-radicals in its structure is present in the absorption tank 6. As an absorbent to be used in absorption tank 6, a zeolite absorbent can be employed, an activated absorbent, such as an activated carbon material and/or a resinous absorbent or mixtures thereof are used as absorbent 9 as long the absorbent has an ion-radical in its structure. Preferred absorbents are zeolite and activated carbon. Activated carbon materials and their method of preparation are well known in the art and zeolites are a class of synthetic aluminum silicates that can be hydrated of the type:

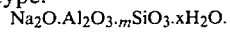
$Na_2O \cdot Al_2O_3 \cdot mSiO_3 \cdot xH_2O$.

These compounds have been disclosed in detail in R. F. Gould "Molecular Sieve Zeolites -I", Advances in Chemistry Series 101, American Chemical Society, Washington, D.C. 1971.

Since the absorbing pore side of zeolite absorbents contemplated herein are ordinarily less than 10 angstroms (Å) and that activated carbon absorbence are usually less than 40 angstrom (Å) in general, these porous structures are so much smaller than the molecules of the treated electric insulating liquid that the molecules of the liquid are not absorbed and thus loss of the liquid as happens in the prior art method is avoided. Moreover, since the pore size of such absorbents are small, they have a high capacity to absorb the low molecular impurities present in such liquids and this, coupled with the coulomb force or attraction between the absorbent and the charged impurities in the previous step, the use of such absorbents makes it possible to selectively eliminate these low molecular weight contaminants which interfere with the insulating properties of the electrical insulating fluid. Of course, the absorbent may be an absorbent with an ion-radical or a cation-radical, or mixtures thereof, depending on whether or not the charge on the contaminants is positive or negative.

As another feature of the present invention, the absorbent, such as a zeolite absorbent, is coated on the surface thereof with the same substance or conductive contaminants known to exist in the insulating fluids, such as iron, copper and cadmium molecules or ions. By applying this coating, the absorption of impurities is speeded up by virtue of the multilayer electrostatic effect that occurs in that the same kind of ion grows in accumulated layers in stratified form, when the heavy metal ion begans to agglutinate on the surface of the absorbent.

Referring still to the embodiment in FIG. 1, the liquid is passed through the absorption tank 6 into the percolator 7 where the rough or large particles which are unabsorbed by the absorbent in absorption tank 6 are eliminated in the percolator 7. Indeed, this percolator can be substituted in FIG. 1 by any device which can eliminate the rough particles directly so a material such as a centrifuge and precipitation tank can be used instead of the percolator 7. These rough impurities, of course, are those impurities which become agglutinated by the action of the high voltage electric field applied in the ionizer 4 which cause the particles to grow to micro-unit size, such that they are not absorbed by the absorbent 9 in tank 6.

Figure 2:
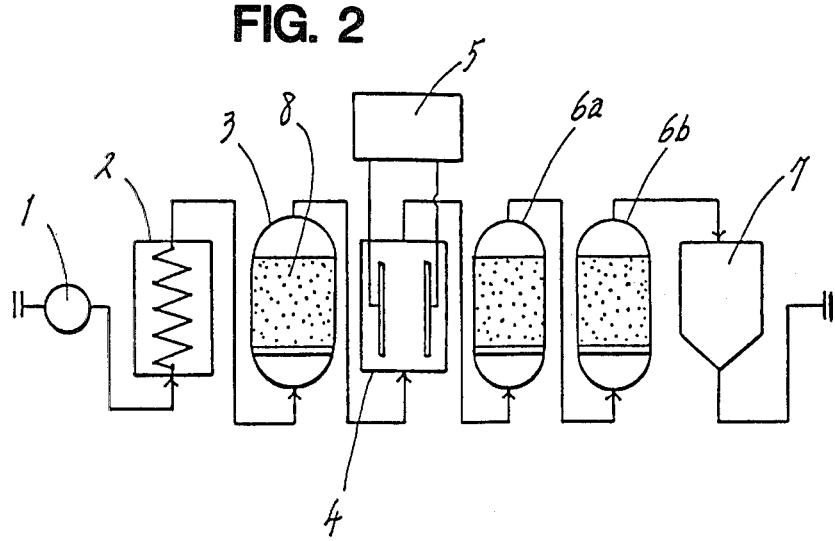
FIG. 2 shows another embodiment of the present invention and apparatus to carry out such embodiment.

FIG. 2 shows another embodiment of the present invention having two absorption tanks following the ionizer 4. The first absorption tank 6a is filled with an absorbent having anion-radicals, such as a zeolite absorbent and a second absorption tank 6b filled with an absorbent having a cation-radical in its structure, such as typified by activated carbon absorbents; these two absorption tanks 6a and 6b have absorbents of opposite polarities. By this procedure, the cation-radical impurities in the electrical insulating liquid are eliminated in the first absorption tank 6a and the anion-radical impuities are eliminated in the second absorption tank 6b. Since the absorbent used may have many types of ion-radicals in its structure, the absorbent for each absorption tank can be suitably chosen so as to eliminate contaminants charged with oppositely charged impurities. According to FIG. 2, the other parts of the apparatus are the same as in FIG. 1 namely, the pump 1, the heater 2, the front treatment tank 3, the ionizer 4 and the percolator 7 are the same as in FIG. 1.

Figure 3:
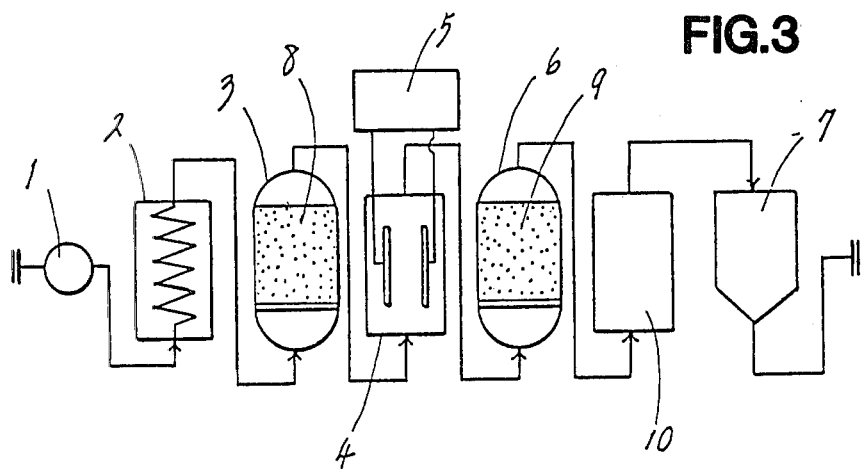
FIG. 3 is a flow diagram showing still another embodiment of the present invention and the apparatus to be employed.

FIG. 3 shows still another embodiment of the present invention. According to this embodiment, an idle tank 10 is installed between the absorption tank 6 and the direct illuminating device, such as the percolator 7. By this procedure, the tank 10 serves to maintain the liquid in the tank to condense and agglutinate the particles so as to facilitate efficient elimination in percolator 7 and/or any other particle eliminating device. When said tank 10 is not employed, the pipes between tank 6 and percolator 7 may be adjusted in length to increase the time between the exit from tank 7 and entrance into percolator 7 so as to provide sufficient time to increase the condensation or aggltutination of the particles not absorbed in the absorbent 6.

Furthermore, the heater 2 and the front treatment tank 3 comprising the first treatment steps of the disclosed process, preceding the ionizer 4 can be suitably modified or omitted in the case when the insulating liquid having good insulating quality is refined. By refining herein is also meant the generation of the used liquid so as to purify the electrical insulating liquid after being used in an electrical device.

Finally, it must be emphasized that the preceding specific embodiments are illustrative of the practice of the invention. It must be understood, however, that other expedients known to those skilled in the art, as disclosed herein, may be employed without departing from the spirit of the invention or the scope of the appended claims.

What I claim is:

1. A process for refining an electric insulating liquid to remove contaminant particles present as impurities in insulating liquids therefrom which comprises applying an electric field to the electric insulating liquid under a voltage sufficient to charge the contaminant particles; contacting said electric insulating liquid with at least one porous absorbent having ion radicals in its structure and a pore size smaller than the size of the molecules of the treated insulating liquid to remove the charged contaminants having a size smaller than the pore size of the absorbent; and then passing the liquid through means for removing contaminating particles larger than the pore size of the absorbent and recovering the purified electric insulating liquid.

2. A process according to claim 1 wherein the contaminant particles are selected from the group consisting of low molecular weight polar compounds, metal compounds or metal ions and mixtures thereof, which particles tend to deteriorate the insulating properties of the electric insulating liquid, unless removed.

3. A process according to claim 1 wherein the absorbent is zeolite.

4. A process according to claim 3 wherein the pore size of the zeolite is less than about 10 angstroms.

5. A process according to claim 1 wherein the absorbent is activated carbon.

6. A process according to claim 5 where the activated carbon has a pore size of less than 40 angstroms.

7. A process according to claims 1, 2, 3, 4, 5 or 6 wherein the absorbent is coated with metallic compounds containing the same metals present as a contaminant in the electric insulating liquid, which coating serves to speed up the process of absorbing the metal contaminants by the coated absorbent.

8. A process according to claim 1 in which the electric insulating liquid, after being subjected to the electric field, is subjected to two absorption steps by (1) contacting the liquid first with an absorbent containing anion-radicals in its structure and then (2) contacting the liquid with an absorbent containing cation-radicals in its structure.

9. A process according to claim 8 in which the absorbent in step (1) is zeolite and the absorbent in step (2) is activated carbon.

10. A process according to claim 9 in which one or both absorbents are coated with metallic compounds containing the same metals which are present as contaminants in the electric insulating liquid so as to speed up the process of absorbing the metal contaminant by the coated absorbent.

11. A process according to claims 1, 2, 3, 4, 5, 6, 8, 9 or 10 in which the electric insulating liquid is first heated and then subsequently contacted with an absorbent prior to the charging step with the electric field to preliminarily remove contaminant particles therefrom.

12. A process according to claim 11 in which the absorbent used in the absorbing step prior to said charging step with the electric field is selected from the group consisting of kaolin, activated alumina, zeolite, activated carbon and mixtures thereof.

13. A process according to claim 1 wherein the electric field is a static electric field applied with a voltage sufficient to charge the contaminant particles.

14. A process according to claim 1 wherein the electric field applied is an alternating electric field.

15. A process according to claim 1 in which the means used to remove the larger particles from the electric insulating material after the absorbent step is a percolator.

16. A process according to claim 1 wherein the means used to remove the larger particles from the electric insulating liquid after the absorbent step is a centrifuge.

17. A process according to claim 1 wherein the means used to remove the particles from the electric insulating liquid after the absorbent step is a precipitation tank.

18. A process according to claims 1, 15, 16 or 17 wherein the electric insulating liquid charged by the electric field is transferred first to a setting vessel prior to being introduced into the means for eliminating the particles of larger size than the pore size of the absorbent so as to permit the larger particles to settle out prior to said removal means.

19. A process according to claim 1 wherein the electric field applied to the electric insulating liquid is a combination of a static electric field and an alternating electric field.

* * * * *